United States Patent [19]

Ayalia-Esquilin et al.

[11] Patent Number: 5,421,868

[45] Date of Patent: Jun. 6, 1995

[54] INK COMPOSITION

[75] Inventors: Juan Ayalia-Esquilin; Ying-Ying Cheng; Arthur F. Diaz; Paul L. Gendler, all of San Jose; Thomas E. Karis, San Martin, all of Calif.

[73] Assignees: International Business Machines Corporation, Armonk, N.Y.; Lexmark Corporation, Lexington, Ky.

[21] Appl. No.: 174,631

[22] Filed: Dec. 28, 1993

[51] Int. Cl.[6] ............................................. C09D 11/02
[52] U.S. Cl. ............................ 106/20 R; 106/22 H; 106/22 A
[58] Field of Search ............... 106/22 H, 23 H, 20 R, 106/22 A, 23 A

[56] References Cited

U.S. PATENT DOCUMENTS

| | | | |
|---|---|---|---|
| 2,245,104 | 6/1941 | Greubel | 131/53 |
| 3,013,020 | 12/1961 | Fancher et al. | 260/340.5 |
| 3,224,893 | 12/1965 | Floyd et al. | 106/316 |
| 3,761,509 | 9/1973 | Lesher | 260/471 C |
| 3,840,598 | 10/1974 | Lesher et al. | 260/559 R |
| 4,213,872 | 7/1980 | Cooper | 430/114 |
| 4,365,998 | 12/1982 | Sugiyama et al. | 106/22 H |
| 4,775,594 | 10/1988 | Desjarlais | 428/421 |
| 4,820,346 | 4/1989 | Nowak | 106/22 |
| 4,830,671 | 5/1989 | Frihart et al. | 106/27 |
| 4,878,946 | 11/1989 | Tabayashi et al. | 106/27 |
| 4,889,560 | 12/1989 | Jaeger et al. | 106/27 |
| 5,000,786 | 3/1991 | Matsuzaki | 106/27 |
| 5,006,170 | 4/1991 | Schwarz et al. | 106/20 |
| 5,106,417 | 4/1992 | Hauser et al. | 106/20 |
| 5,118,347 | 6/1992 | You et al. | 106/20 |
| 5,122,187 | 6/1992 | Schwarz et al. | 106/25 |
| 5,124,719 | 6/1992 | Matsuzaki | 346/1.1 |
| 5,131,949 | 7/1992 | Tochihara et al. | 106/20 |
| 5,173,112 | 12/1992 | Matrick et al. | 106/22 H |
| 5,223,026 | 6/1993 | Schwarz, Jr. | 106/22 H |
| 5,254,159 | 10/1993 | Gundlach et al. | 106/22 H |

FOREIGN PATENT DOCUMENTS 479501 9/1991 European Pat. Off. ....... B41J 2/175

OTHER PUBLICATIONS

Shavaika et al., "Hydrazides and acyl derivative of hydrazides of methacrylic and isobutyric acids", 35—Noncondensed Aromatic Compounds, vol. 59, pp. 9873–9874. (Abstract only) Jun. 1963.

Searle et al., "Improved Richaman–Atkins Syntheses of Cyclic Polyamines Particularly 1,4,7-Triazacyclononane (tacn) and 1,4,7-Triazacyclodecane (tacd), with the Aid of Cation-Exchange in Purification and Isolation", Aust. J. Chem., 1984, 37, 959–70. no month.

Molaire et al., "Organic Monomeric Glasses: A Novel Class of Materials", Journal of Polymer Science: Part A: Polymer Chemistray, vol. 27, 2529–2592 (1989). no month.

*Primary Examiner*—Helene Klemanski
*Attorney, Agent, or Firm*—Robert B. Martin

[57] ABSTRACT

The present invention relates to an ink composition for ink jet printers comprising an amorphous bis amide, a colorant and a solvent.

3 Claims, No Drawings

INK COMPOSITION

FIELD OF THE INVENTION

The present invention relates to ink compositions for ink jet printers and in particular relates to hot melt ink composition for thermal ink jet printers.

BACKGROUND OF THE INVENTION

Ink jet printing is accomplished by ejecting ink from a nozzle toward paper or other print medium. The ink is driven from the nozzles toward the medium in a variety of ways. For example, in electrostatic printing, the ink is driven from a nozzle toward a medium with an electrostatic field. Another ink jet printing procedure, known as squeeze tube, employs a piezo-electric element in the ink nozzle. Electrically-caused distortions of the piezoelectric element pump the ink through the nozzle and toward the print medium. In still another ink jet printing procedure, known as thermal or bubble ink jet printing, the ink is driven from a nozzle and toward the print medium by the formation of an expanding vapor-phase bubble in the nozzle. These various printing methods are described in Output Hard Copy Devices, edited by Durbeck and Sherr, Academic Press 1988, see particularly chapter 13 entitled Ink Jet Printing.

Hot melt ink compositions for use in ink jet printers are generally crystalline or semicrystalline and generally comprise a polymeric binder, an organic solvent and colorant. The compositions are solid at room temperature to avoid evaporation or spillage during periods of nonprinting. For hot melt ink compositions for thermal ink jet printers, the organic solvent functions as a bubble former which vaporizes in the heating chamber to drive the ink out of the nozzle and towards the print medium.

During use, the hot melt ink is heated so that it melts and the melted ink is propelled through the nozzle onto the recording paper. The rapidly cooling ink then solidifies on the surface of the paper. Unfortunately, due in large part to the crystalline nature of the ink, the ink dot can be smeared on the recording paper by friction or pressure. In order to mitigate the problem of smearing, the molecular weight of the polymeric binder was increased to form a more cohesive solid. Unfortunately, the increase in molecular weight of the polymeric binder caused a corresponding increase in the viscosity of the melted ink which exacerbated drop misdirection and clogging problems during the jetting process. Further, the crystalline nature of the ink composition causes specular reflections from the crystal faces resulting in lower optical density. In order to avoid the problems associated with polymeric binders Tochihara et al., in U.S. Pat. No. 5,131,949 issued Jul. 21, 1992, discloses the use of ink formulations comprising amides or bisamide as the binder. However, Tochihara teaches that these compounds are crystalline.

Therefore, there still is a need in the art for an ink composition for ink jet printers which has low viscosity in the liquid state and has good smear resistance and optical density.

It is therefore an object of the present invention to provide an improved ink composition for ink jet printers.

Other objects and advantages will become apparent from the following disclosure.

SUMMARY OF THE INVENTION

The present invention relates to an ink composition for ink jet printers comprising a low molecular weight, amorphous bis amide, a solvent and a colorant. The his amide can be selected from carbonyl bis amides, (RCO-N—)$_2$; bis thioamides (RCSN—)$_2$ or sulfonyl bis amides (RSO$_2$N—)$_2$ where R is an aromatic or cycloalkyl substituent. Each amide or the bis-amide has an aromatic or cycloalkyl substituent preferably aromatic substituent. The bis amide forms an amorphous, glassy solid on the print medium. The bis amide preferably has asymmetric nitrogen atoms. Preferably, the bis amide compound comprises a secondary amide covalently bonded to a tertiary amide. The ink composition is preferably solid at room temperature for use in the ink jet printers. Preferably, the solvent for the hot melt ink composition is an organic solvent. The ink composition has low viscosity at the operating temperature of ink jet printers and has excellent resistance to smearing and good optical density, due to its amorphous state.

A more thorough disclosure of the present invention is presented in the detailed description which follows.

DETAILED DESCRIPTION OF THE INVENTION

The present invention relates to an ink composition for ink jet printers comprising an amorphous his amide, a solvent and a colorant. Preferably the bis amide is asymmetric due to secondary and tertiary asymmetric nitrogen atoms.

Preferably the bis amide has the following structure:

$$R_1-NH-(CH_2)_n-NR-R_2$$

where $R_1$ and $R_2$ are independently arylcarbonyl, substituted arylcarbonyl, arylthiocarbonyl, substituted arylthiocarbonyl, arylsulfonyl or substituted arylsulfonyl where aryl is preferably phenyl or lower cycloalkyl preferably $C_{1-7}$ cycloalkyl (e.g. $C_6$). R is hydrido or preferably hydroxy, cyano, alkyl, cycloalkyl, alkenyl, or more preferably lower alkyl preferably having 1 to 4 carbon atoms and n is 0 to 10 preferably 0–6. Preferred substituents for substituted aryl are alkyl ($C_{1-6}$), nitro, hydroxy, alkoxy ($C_{1-6}$), halo, carboxy and sulfo and salts thereof, alkoxycarbonyl and alkylcarbonyl. The aryl group can be substituted by other substituents known to those skilled in the art which do not unacceptably interfere with the performance of the ink composition in ink jet printers. $R_1$ and $R_2$ are preferably aromatic substituents on each of the two nitrogen atoms of the bis amide (on each of the amides) and although $R_1$ and $R_2$ are conveniently the same substituent, the nitrogens atoms are preferably asymmetric due to the R substituent which forms a tertiary amide. Preferred aromatic bis amides for use in the ink composition of the present invention are N,N'-bis(p-nitrobenzoyl)-N-methyl ethylene diamine; N,N'-bis(3,5-dinitrobenzoyl)-N-methyl ethylene diamine; N,N'-bis(p-nitrobenzoyl)-N-methyl propylene diamine; and N,N'-bis(3,5-dinitrobenzoyl)-N-methyl propylene aliamine. Water soluble bis amides of the present invention suitably have an aromatic carboxy or sulfo substituent or salts thereof. Suitable salts include alkali or alkaline salts such as hydroxy or amine salts. The compounds can be synthesized from the ester precursor.

The amorphous nature of the printed ink composition is dominated by the nature of the binder, the bis amide, and is characterized by the presence of a glass transition temperature (Tg). Tg can be measured by art known methods.

Generally, the bis amide will comprise about 20 to 90 weight % of the ink composition preferably about 30 to 75 weight %. Optionally, the aromatic bis amide component can comprise mixtures of aromatic bis amides including mixtures where $R_1$ and $R_2$ are not identical.

The second component of the ink composition of the present invention is the solvent. Preferably, the solvent is an organic solvent. However, some bis amides of the present invention are water soluble. For thermal ink jet printers, the solvent also functions as the bubble former. Suitable organic solvents are known to those skilled in the art such as glycols, amides, sulfones and sulfoxides. Suitable bubble formers include water, alcohols, glycols, amides, sulfones and sulfoxides. The preferred bubble formers are water, and ethylene glycol. Other suitable bubble formers will be known to those skilled in the art. The organic solvent generally comprises about 10 to 75 weight % of the ink composition, preferably about 20 to 50 weight %. Preferably, for thermal ink jet compositions, the bubble former is admixed with a dipolar organic solvent such as dimethylsulfoxide (DMSO) or 2-pyrrolidinone. A preferred bubble former is water/DMSO.

Lastly, the ink composition comprises a colorant. Suitable colorants include pigments and dyes which are capable of being dispersed or dissolved in the binder and/or the organic solvent and are compatible with the ink components. Examples of suitable commercial available colorants are sold under the names carbon black, Zapon, Neozapon, Neopen and Neptun. Other suitable colorants will be known to those skilled in the art.

The colorant generally comprises about 0.2 to 10 weight % of the ink composition, preferably about 0.5 to 5 weight %.

In addition, the ink composition of the present invention may include optional additives such as (a) dispersing agents or surfactants (b) plasticizers (c) antioxidants (d) biocides (e) antikogants and (f) humectants.

The ink composition of the present invention can be utilized in a variety of ink jet printers such as bubble jet, squeeze tube or electro-jet and preferably bubble jet printers. The hot melt ink composition of the present invention has a low viscosity of less than 20 centipose (cp) preferably less than 10 cp at the operating temperature of ink jet printers 50° to 175° C. preferably 75° to 150° C. The ink compositions of the present invention are preferably solid at room temperature of 15°-20° C.

The ink compositions of the present invention are quick drying to form an amorphous solid. The compositions generally dry completely within 1 minute and dry to the touch within a few seconds. Surprisingly, due to their amorphous nature, the dry print of the ink composition of the present invention exhibit smear resistance without print through and fracture of the print occurs before any observable smearing. Lastly, due to their amorphous nature, the ink compositions have higher optical densities.

The following examples are detailed descriptions of methods of preparation and use of the ink compositions of the present invention. The detailed descriptions fall within the scope of, and serve to exemplify, the more general description set forth above. The examples are presented for illustrative purposes only, and are not intended as a restriction on the scope of the invention.

Example 1

The following amorphous asymmetric bis amides were prepared by standard synthetic procedure.

1(a) Synthesis of N,N'-dibenzoyl-N-methyl ethylene diamine (EDA)

To a 100 ml round-bottom 3-neck flask fitted with a low temperature thermometer, an addition funnel capped with a nitrogen bubbler, and a magnetic stir bar was added benzoyl chloride (11.8 g, 9.75 ml, 84 mMole) and CHCl3 (40 ml). This solution is cooled to about −10° C. with a dry ice/acetone bath when a mixture of triethylamine (8.50 g, 11.71 ml, 84 mMole, reagent grade stored over KOH) and N-methylEDA (2.97 g, 3.53 ml, 40 mMole) was added dropwise over about 30 minutes keeping the temperature below 0°. The reaction is allowed to warm to room temperature and stirred several hours during which a precipitate forms (triethylamine hydrochloride).

The reaction mix is partitioned between water and CHCl3, the organic layer washed (0.1MHCl, pH 10 carbonate, water), dried (MgSO4), filtered and the solvent evaporated to give oil (13.69 g-121.4%). The oil is triturated with hexane (50 ml), the hexane is decanted and the crude solid is from EtOH/water (50 ml EtOH and about 100 ml water) and allowed to cool slowly overnight. The precipitate is filtered off, washed with water, and dried (50°, house vacuum) to give 8.7 g (77%) product m.p. 121° C.; Tg 15° C., viscosity at 150° C. is 8 cp.

1(b) Synthesis of N,N'-bis(3,5-dinitrobenzoyl)-N-methyl EDA

To a 250 ml round-bottom 3-neck flask fitted with a low temperature thermometer, an addition funnel capped with a nitrogen bubbler, and a magnetic stir bar were added 3,5-dinitrobenzoyl chloride (19.367 g, 84 mMole) and CH2Cl2 (80 ml). This solution is cooled to about −10° C. with a dry ice/acetone bath when a mixture of triethylamine (8.50 g, 11.71 ml, 84 mMole, reagent grade stored over KOH) and N-methylEDA (2.97 g, 3.53 ml, 40 mMole) was added dropwise over about 30 minutes keeping the temperature below about −10° C. The reaction is allowed to warm to room temperature and stir several hours during which a precipitate of triethylamine hydrochloride and the desired product forms.

The reaction mix is diluted with water, stirred for about an hour, filtered, the precipitate washed with CH2Cl2, water, and then treated with boiling EtOH/water for a few minutes, filtered, washed with water and dried to give 18.39 g (99.4%) product m.p. 226° C.; Tg 83.5° C.

1(c) Synthesis of N,N'-bis(3,5 dinitrobenzoyl)-N-methyl-1,3-propanediamine.

To a 100 ml round-bottom 3-neck flask fitted with a low temperature thermometer, an addition funnel capped with a nitrogen bubbler, and a magnetic stir bar were added 3,5-dinitrobenzoyl chloride (9.684 g, 42 mMole) and CH2llC2 (40 ml). This solution is cooled to about −10° C. with a dry ice/acetone bath when a mixture of triethylamine (4.25 g, 5.854 ml, 42 mMole, reagent grade stored over KOH) and N-methylEDA (1.763 g, 2.089 ml, 20 mMole) was added dropwise over about 30 minutes keeping the temperature below about −10° C. The reaction is allowed to warm to room temperature and stir several hours during which a co-precipitate of triethylamine hydrochloride and the desired product forms.

The reaction mix is diluted with water/pit 10 buffer mixture, stirred for about an hour, filtered, the precipitate washed with CH2Cl2, water, and then dried to give 9.033 g (94.9%) product m.p. 183.6°; Tg 66° C.

Following standard laboratory procedures the following additional examples were synthesized.

| | R—NH—(CH$_2$)$_n$—NY—R | | | | |
|---|---|---|---|---|---|
| | R | Y | n | Tg (°C.) | MP (°C.) |
| d. | 4-nitrobenzoyl | Me | 2 | 51 | 197 |
| e. | benzoyl | Et | 2 | 8 | 125 |
| f. | 4-nitrobenzoyl | Et | 2 | 45 | 170 |
| g.* | benzoyl | Me | 0 | 33 | 154 |
| h. | thiobenzoyl | Me | 2 | 23 | 101 |
| i. | benzoyl | Me | 3 | 1.6 | 140 |
| j. | 3,5 dinitrobenzoyl | Me | 0 | 98 | 140 |
| k. | 4-methyl(phenylsulfonyl) | Me | 2 | 15 | 102 |
| l. | 4-nitro(phenylsulfonyl) | Me | 2 | 41 | 184 |

*Viscosity at 150° C. = 17 cp

Example 2

Two ink compositions were tested in an HP Thinkjet type printer which had been modified for use at 150° C. A test pattern was printed at 150° C.; 800 Hz and 300 dots/inch. The first composition comprised 40 weight % of Ex. 1(d), 58.5 weight % of 1,3-propanediol and 1.5 weight % of orasol black 9342A. The second composition comprised 80 weight % of crystalline N,N'-diacetyl-1,3-propanediamine, 18 weight % water and 2 weight % food color black #2. Several lines of each ink composition were printed and then the compositions were smear tested at specific time intervals of 0, 1, 10, 30 and 60 minutes. The second composition exhibited substantial smearing at the 0 and 1 minute time intervals whereas the first ink composition of the present invention did not smear even at the 0 minute test. The second ink composition also leathered and penetrated through the paper to form lines on the backside of the paper. The first ink composition did not feather nor did it print through.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A hot melt ink composition for ink jet printers comprising a solvent, a colorant and an amorphous, asymmetric bis amide binder where each amide is selected from carbonyl amide, thioamide or sulfonyl amide.

2. The ink composition of claim 1 wherein said solvent comprises water, glycol or dimethylsulfoxide.

3. The ink composition of claim 1 wherein said bis amide is selected from

N,N'-bis(p-nitrobenzoyl)-N-methyl ethylene diamine;

N,N'-bis(3,5-dinitrobenzoyl)-N-methyl ethylene diamine;

N,N',-bis(p-nitrobenzoyl)-N-methyl propylene diamine; or

N,N'-bis(3,5-dinitrobenzoyl)-N-methyl propylene diamine.

* * * * *